Aug. 19, 1947.                E. R. ROSS                2,425,830
            ADJUSTABLE-ELECTRODE ARC WELDING TORCH
                        Filed April 23, 1945
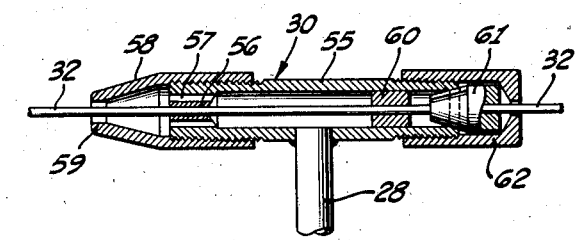
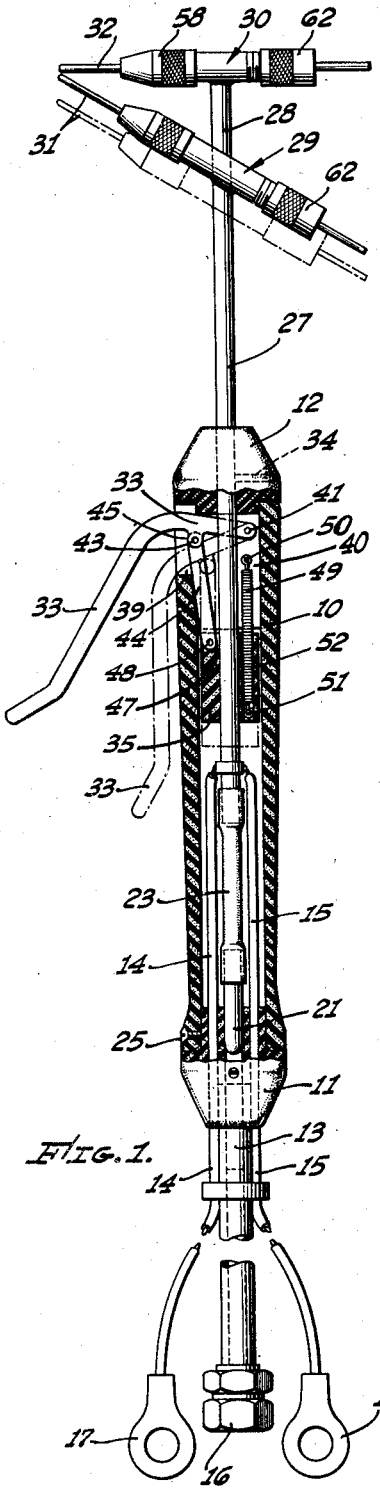
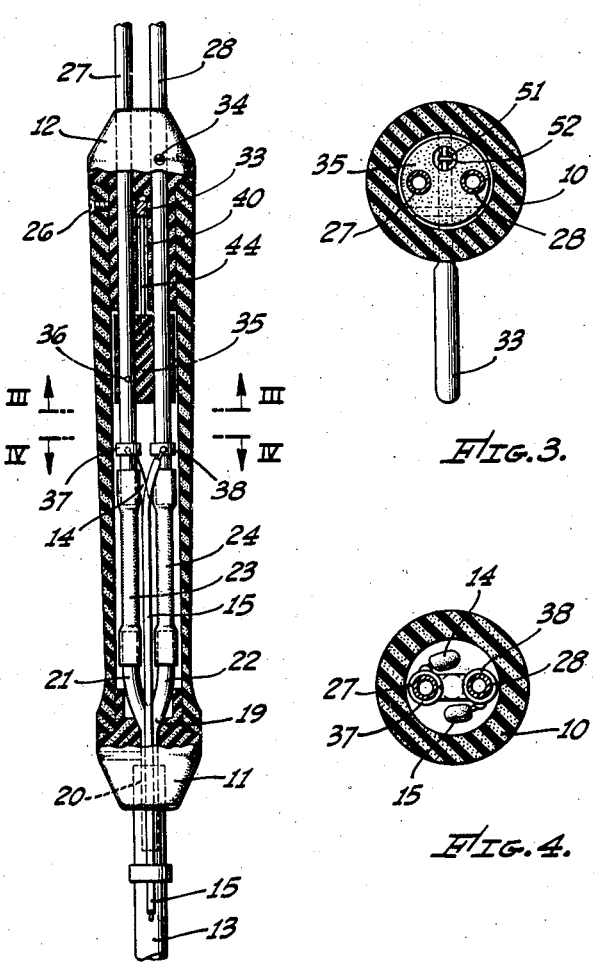
FIG. 5.
FIG. 3.
FIG. 4.
FIG. 2.
FIG. 1.
INVENTOR.
ELMER R. ROSS,
BY
ATTORNEY.

Patented Aug. 19, 1947

2,425,830

UNITED STATES PATENT OFFICE 2,425,830

ADJUSTABLE-ELECTRODE ARC-WELDING TORCH

Elmer R. Ross, San Diego, Calif., assignor to Solar Aircraft Company, San Diego, Calif., a corporation of California Application April 23, 1945, Serial No. 589,759

2 Claims. (Cl. 219—14)

This invention relates to electric arc welding torches and particularly to torches of the type employed in atomic hydrogen welding which employ a pair of relatively movable, relatively non-consumable electrodes between which an arc is maintained, with means for directing a stream of hydrogen through the arc and onto the work to be heated.

As is well known, the hydrogen undergoes an atomic change in passing through the arc and another change as it leaves the arc, the second change resulting in the liberation of a large amount of heat.

An object of the invention is to provide a torch of the type described which is easily manipulated and light in weight so that an operator can use it continuously for relatively long stretches of time without becoming unduly fatigued.

The manner in which the foregoing object is achieved, together with other more specific objects and features of the invention will become apparent from the description to follow of a specific embodiment of the invention as illustrated in the drawing, in which:

Fig. 1 is a side view of the torch with a portion of the handle casing broken away to show the interior construction;

Fig. 2 is a view of the handle portion of the torch taken at right angles to the view of Fig. 1 and with a portion of the handle casing broken away;

Fig. 3 is a cross section taken in the plane III—III of Fig. 2;

Fig. 4 is a cross section taken in the plane IV—IV of Fig. 2; and

Fig. 5 is a longitudinal section through one of the tips.

Referring first to Fig. 1, the torch therein disclosed comprises a handle portion consisting of a tubular hollow, non-conductive casing 10 having detachable, non-conductive end closures 11 and 12 located at the rear and forward ends, respectively, of the casing 10. The rear end closure 11 has a relatively large central opening in its outer end from which a gas hose 13 projects, and a pair of holes on opposite sides of the central hole through which electric leads 14 and 15 extend. At their remote ends, the tube 13 and the leads 14 and 15 are provided with suitable connectors 16, 17 and 18 for connection to the gas source and the electric source.

The rear closure member 11 contains therewithin a metal Y connector 19 having a rearwardly extending stem 20 to which the hose 13 connects, and a pair of forwardly extending branches 21 and 22 which extend beyond the inner end of closure member 11 and connect to the rear end of a pair of flexible rubber tubes 23 and 24, respectively. The closure member 11 is detachably connected to the casing 10 by a screw 25 extended through the casing and into the re-entrant portion of the plug 11.

The front closure member 12 is similarly connected to the casing 10 by a screw 26. The re-entrant portion of the plug 12 is longer than the re-entrant portion of the plug 11 and supports a pair of parallel metal tubes 27 and 28, on the outer ends of which are mounted a pair of tips 29 and 30.

The tube 28 is longer than the tube 27 and extends beyond the tip 29 as shown in Fig. 1. The outer end of the tube 28 is bent toward the tube 27 to bring the tip 30 in the same longitudinal plane as the tip 29. Furthermore, the two tips are arranged at an angle to each other so that electrodes 31 and 32 projecting from the tips can be brought together to strike the arc. After the arc has been struck, the tips are separated by sliding the tube 27 longitudinally into the handle by actuation of a trigger 33. Thus when the trigger is in the normal position shown in Fig. 1 in full lines, the tube 27 and the tip 29 are extended to bring the electrode 31 against the electrode 32. However, when the trigger 33 is moved toward the casing 10 as shown in broken lines, the tube 27 and tip 29 are moved inwardly as indicated in broken lines.

Referring now to Fig. 2, the tube 28 is rigidly secured in the plug 12, being locked in place by a set screw 34. The tube extends a substantial distance beyond the plug 12 and is connected at its rear end to the forward end of a rubber tube 24 which supplies gas thereto.

There is positioned below the plug 12, a cylindrical block 35 of insulating material which is of slightly smaller diameter than the re-entrant portion of plug 12 so that it can move longitudinally within the case 10. This block has a hole slightly larger than the tube 28 through which the latter projects so that the block 35 can slide along the tube 28.

The movable tube 27 is slidably fitted in the hole provided therefor in the member 12, but instead of being slidably mounted within the block 35 as the tube 28, it is locked to the block 35 by a set screw 36. In use, the tube 27 is reciprocated by the block 35 which in turn is reciprocated in response to the actuation of the trigger 33 by a mechanism next to be described.

The lower end of the tube 27 below the block 35 is connected to the upper end of the rubber tube 23 which supplies gas thereto. The tube 23 has sufficient elasticity to permit the necessary longitudinal movement of the tube 27. The two electrical leads 14 and 15 are electrically connected to the lower ends of the tubes 27 and 28, respectively, by clamps 37 and 38.

The trigger 33 extends through a slot 39 provided therefor in the casing 10 and into a juxtaposed slot 40 in the re-entrant portion of the end member 12 and its inner end is pivotally connected to the plug 12 by a pivot pin 41. At a point spaced from the pivot 41 a distance substantially the diameter of the re-entrant portion of the end member 12, the trigger 33 has a pair of downwardly depending parallel ears 45 to which the upper end of a link 44 is secured by a pivot pin 43. This link extends down within the slot in the end member 12 and into a short slot 47 in the upper end of the block 35 to which it is secured by a pivot pin 48. When the trigger 33 is depressed, the block 35 is, therefore, moved downwardly by the link and it carries the tube 27 with it. During this movement, of course, the tube 27 slides within the end member 12 and the block 35 slides along the tube 28.

To normally retain the block 35 in upper position, a small helical tension spring 49 is stretched between a cross pin 50 in the end member 12 and a cross pin 51 in the block 35. It will be noted that the spring 49 lies within the slot 40 in the member 12 and within a hole 52 in the block 35 so that it has sufficient length to provide the necessary stretch without exceeding its limit of elasticity.

Referring now to Fig. 1, both of the tips 29 and 30 are of the same construction except that the tip 29 is made slightly longer than the tip 30.

The interior construction of the tips is shown in Fig. 5. Thus each tip comprises a tubular body member 55 which is secured near its middle to the related tube 28 in the case of tip 30, or the tube 27 in the case of the tip 29. The connection between the tube and the member 55 may be made by brazing or welding. Near its forward end, the member 55 is provided with an insert 56 which may be pressed into the tube 55. The insert has a central aperture for slidably receiving and guiding the electrode 32 and has a plurality of longitudinal passages 57 surrounding the central aperture for the passage of gas. A front end cap 58 is screwed onto the forward end of the member 55 and it has a central orifice 59 of substantially larger diameter than the electrode 32 through which the latter projects. The orifice 59 is so proportioned relative to the passages 57 and the pressure at which the gas is supplied as to provide a stream of gas of desired velocity which is projected along the electrode.

Near its rear end, the tubular member 55 has a second insert 60 which has a single central hole dimensioned to slidably receive the electrode 32 while forming a relatively close fit therewith so as to minimize leakage of gas.

At the extreme rear end of the member 55 a clutch is provided for clamping the electrode 32. This clutch comprises a slotted chuck member 61 having a conical or tapered forward end which fits within the orifice at the rear end of the tubular member 55 and is held in place by a cap 62 screwed onto the rear end of the member 55, the cap 62 having a small hole in its rear end for the passage of the electrode 32.

The electrodes burn away slowly as the torch is used and eventually become too short to make contact. When this occurs, the electrodes can be readjusted by simply loosening the screw caps 62, advancing the electrodes the desired amount, and then retightening the caps 62.

The torch construction described is very light in weight. The tips 29 and 30 are made of metal but they are relatively small so that their weight is not excessive. The tubes 27 and 28 are likewise relatively small and light. The handle assembly is made largely of non-metallic, light materials.

Thus the handle casing 10 is preferably of hard rubber or plastic, and the end closure members 11 and 12 can be made of light plastic or of wood. The block 35 is also made of light plastic or wood.

It is particularly to be noted that the construction of the torch including the casing 10 and the end plugs 11 and 12 of insulating material and the use of insulating material for the sliding block 35 insures that all portions of the device with which the hands of the operator come in contact are electrically insulated from the current conducting metallic elements within the handle.

Although for the purpose of explaining the invention a specific embodiment thereof has been described in substantial detail, various departures from the exact construction can be made without departing from the invention which is to be limited only to the extent set forth in the appended claims.

I claim:

1. A double-electrode, arc-welding torch comprising: a handle having two parallel electrode-supporting rod members projecting from one end thereof and adapted to support a pair of electrodes for movement toward and away from each other, said handle comprising a tubular casing member of electrical insulating material having a closure plug of insulating material at its forward end through which said rod members extend; means locking one of said rod members to said closure plug, the other rod member being slidable within said plug; a block slidable within said casing member back of said closure plug, said block having longitudinal apertures through which said rod members extend; means for locking the other end of said rod members to said slidable block for movement therewith, said one rod member being slidable within said block; said closure plug having a re-entrant, longitudinally slotted portion within said casing member, and said casing member having a slot therein juxtaposed to the slot in said re-entrant portion; a lever having one end extending through said slot in said casing member and into said slot in said re-entrant portion and pivotally connected at its inner end to said re-entrant portion; a link extending longitudinally in said slot in said re-entrant portion; means pivotally connecting one end of said link to said lever and pivotally connecting the other end of the link to said slidable block, whereby swinging movement of said lever displaces said block longitudinally within said casing away from said re-entrant portion; and spring means for urging said block toward said re-entrant portion.

2. A torch as described in claim 1 in which said re-entrant portion of said closure plug and said block have longitudinally extending aligned chambers therewithin, and said spring means comprises a helical tension spring normally lying completely within said chambers and secured at its opposite ends to said closure plug and to said block, respectively.

ELMER R. ROSS.

REFERENCES CITED

The following references are of record in the file of this patent:

UNITED STATES PATENTS

| Number | Name | Date |
|---|---|---|
| 1,040,107 | Allen | Oct. 1, 1912 |
| 2,253,994 | Barclift | Aug. 26, 1941 |